United States Patent
Schrödl et al.

(10) Patent No.: US 8,724,810 B2
(45) Date of Patent: May 13, 2014

(54) METHOD FOR AUTHENTICATING ONBOARD UNITS

(75) Inventors: Sören Schrödl, Mödling (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 12 days.

(21) Appl. No.: 13/574,571

(22) PCT Filed: Jan. 28, 2011

(86) PCT No.: PCT/AT2011/000048
§ 371 (c)(1), (2), (4) Date: Jul. 20, 2012

(87) PCT Pub. No.: WO2011/091459
PCT Pub. Date: Aug. 4, 2011

(65) Prior Publication Data
US 2012/0300929 A1    Nov. 29, 2012

(30) Foreign Application Priority Data
Jan. 29, 2010 (EP) ................................. 10450009

(51) Int. Cl.
*H04K 1/00* (2006.01)
*H04L 29/06* (2006.01)
*H04W 4/00* (2009.01)
*G07B 15/06* (2011.01)

(52) U.S. Cl.
CPC ............. *H04L 63/062* (2013.01); *H04W 4/008* (2013.01); *G07B 15/063* (2013.01)
USPC ....................................................... 380/255

(58) Field of Classification Search
CPC .... G07B 15/063; H04L 63/062; H04W 4/008
USPC ............................................................ 380/255
See application file for complete search history.

(56) References Cited

U.S. PATENT DOCUMENTS

| 5,310,999 | A | * | 5/1994 | Claus et al. | 235/384 |
| 5,926,546 | A | * | 7/1999 | Maeda et al. | 380/270 |

(Continued)

FOREIGN PATENT DOCUMENTS

| EP | 0 769 763 A2 | 4/1997 |
| WO | WO 01/59711 A1 | 8/2001 |

OTHER PUBLICATIONS

International Search Report of corresponding PCT/AT2011/000048, dated Apr. 27, 2011, 6 pages.

(Continued)

*Primary Examiner* — Kambiz Zand
*Assistant Examiner* — Aubrey Wyszynski
(74) *Attorney, Agent, or Firm* — Fiala & Weaver P.L.L.C.

(57) ABSTRACT

A method for authenticating vehicle devices that can conduct dedicated short-range communications with beacons of a road tolling system. The beacons have a system-wide key and the vehicle devices only have individual keys. A supply of pairs of individual keys and associated derivation identifiers is stored in the vehicle device, and for consecutive communications the vehicle device selects a different pair from the supply in each case and uses said pair for the respective communication. The vehicle device is triggered by an interrogation device to perform at least the part of a radio communication in which the vehicle device sends the selected derivation identifier, and the selected derivation identifier is received in the interrogation device and is compared with derivation identifiers of the supply stored in the interrogation device. The vehicle device is then authenticated in the case of consistency of the comparison.

8 Claims, 3 Drawing Sheets

(56) References Cited

U.S. PATENT DOCUMENTS

| | | | |
|---|---|---|---|
| 6,300,882 B1* | 10/2001 | Inoue | 340/933 |
| 6,654,883 B1* | 11/2003 | Tatebayashi | 713/168 |
| 2003/0063742 A1* | 4/2003 | Neufeld et al. | 380/46 |
| 2007/0223702 A1 | 9/2007 | Tengler et al. | |
| 2008/0056495 A1* | 3/2008 | Eguchi et al. | 380/270 |

OTHER PUBLICATIONS

European Search Report of corresponding EP 2 360 645 (10 450 009.5), dated May 17, 2010, 8 pages.
European Office action of corresponding EP 2 360 645 (10 450 009.5), dated Mar. 18, 2011, 9 pages.
European Search Report of EP 2 378 489 (11 005 132.3), dated Sep. 20, 2011, 6 pages.
Jiang, et al., "Bat: A Robust Signature Scheme for Vehicular Networks Using Binary Authentication Tree," IEEE Transactions on Wireless Communications, vol. 8, No. 4, Apr. 2009, pp. 1974-1983, Piscataway, NY, US, (XP011249007).
Raya, et al., "The Security of Vehicular Ad Hoc Networks," SASN'05, Nov. 7, 2005, Alexandria, Virginia, USA, Copyright 2005 ACM 1-59593-227-5/05/0011, 11 pages (XP040031486).
Oehry, et al., "The Cardme Concept," European Commission—DG INFSO, Telematics Application Programme, Transport Sector, CARDME-4, Project IST-1999-29053, Deliverable 4.1, (Final) Jun. 1, 2002, 112 pages (XP002580493).
European Search Report of corresponding EP 2 360 646 (10 450 009.5), dated May 17, 2010, 8 pages.
European Office action of corresponding EP 2 360 646 (10 450 009.5), dated Mar. 18, 2011, 9 pages.
International Preliminary Report on Patentability issued on Sep. 4, 2012 in corresponding International Application No. PCT/AT2011/000048; 12 pages.

* cited by examiner

METHOD FOR AUTHENTICATING ONBOARD UNITS

CROSS-REFERENCE TO RELATED APPLICATION(S)

This application is a National Phase Patent Application and claims priority to and benefit of International Application Number PCT/AT2011/000048, filed on Jan. 28, 2011, which claims the benefit of European Patent Application No. 10450009.5, filed on Jan. 29, 2010, the entire disclosures of which are incorporated herein by reference.

FIELD OF THE INVENTION

The present invention relates to a method for authenticating onboard units, which can conduct dedicated short-range communication (DSRC) communications with beacons of a road toll system.

BACKGROUND

A method for dedicated short-range communication (DSRC) communication between such beacons and onboard units, wherein upon communications with consecutive beacons the onboard units transmit varying derivation codes, is known from the earlier European Patent Application No. 10 450 009.5, the priority of which is claimed here and the disclosure content of which is expressly incorporated herein by reference.

DSRC road toll systems are standardised in standards ISO 14906 and EN 15509, for example. In this case, DSRC communication at the radio interface can occur, for example, in accordance with the WAVE standard IEEE 1609.11. For security reasons, system-wide keys (master keys) are not stored in the onboard units (OBUs) in such DSRC road toll systems, instead these OBUs receive only individual keys derived therefrom (derived keys). Only these individual keys are transmitted or used via the DSRC radio interface.

The derivation code required for this, referred to as "key diversifier" in the standards ISO 14906 and EN 15509, represents an individual identifier for each onboard unit of the respectively used rule for derivation of the individual key (derived key) from the system-wide key (master key). According to the prior art, the derivation code (key diversifier) is made known in every communication between an onboard unit and a beacon by the onboard unit to the beacon, so that this can derive the respective individual key of the onboard unit from the system-wide key "on the fly" for communication with the onboard unit or access thereto.

The invention described in the earlier application No. 10 450 009.5 was based on the knowledge that this configuration poses a data protection problem: since in every DSRC radio communication the—onboard unit specific—derivation code is firstly transmitted from the onboard unit via the radio interface, this could be identified in each case by tapping the radio interface or by targeted fraudulent readout of a passing onboard unit and its route could thus be tracked. A movement profile of a specific onboard unit or its user in a road toll system could thus be plotted.

The invention disclosed in the earlier application No. 10 450 009.5 solved this data protection problem in that upon communications with consecutive beacons the onboard units transmit varying derivation codes, by a pool of pairs on individual keys and associated derivation codes being stored in an onboard unit and as part of a communication with a beacon an onboard unit selecting a pair from this pool and using this for the communication. Thus, it is possible to prevent onboard units from being tracked over a longer period of time or beyond multiple beacon sections on the basis of the derivation codes transmitted by them in DSRC communications.

SUMMARY

In some embodiments, the present invention is a method for authenticating onboard units, which can conduct DSRC communications with beacons of a road toll system. The beacons have a system-wide key and the onboard units only have individual keys, which are respectively formed from the system-wide key on the basis of a derivation code specific to each onboard unit. Upon a communication from an onboard unit, the derivation code is transmitted to the beacon to enable the beacon to emulate the individual key for encrypting or decrypting the communication with the onboard unit or for accessing data stored in the onboard unit.

The present invention is based on the knowledge that the aforementioned functionality can also be used in an advantageous manner to check authenticity, i.e. to authenticate an onboard unit. According to the present invention, a pool of pairs of individual keys and associated derivation codes is stored in the onboard unit. In the case of consecutive communications, the onboard unit respectively selects another pair of keys from the pool and uses it for the respective communication. For authentication, the onboard unit is caused by an interrogation device to conduct at least that part of a radio communication, in which it transmits the selected derivation code. This is received in the interrogation device and compared with derivation codes of the pool stored in the interrogation device, wherein the onboard unit is authenticated when identity is established.

In some embodiments, the onboard unit is caused by the interrogation device to conduct consecutive communications to receive multiple different derivation codes and compare these codes with derivation codes of the pool stored in the interrogation device. The onboard unit is only authenticated when all comparisons establish identity. This enables an even higher reliability of authentication (validation) of the onboard unit to be achieved.

In some embodiments, the pair of keys is selected randomly, or at least, pseudo-randomly from the pool in the onboard unit.

In some embodiments, a subset of the pool of derivation codes stored in the onboard unit can be used only for the interrogating purposes. Thus, these derivation codes are never transmitted to beacons and remain secret up to the time of monitoring, and protected from attempts at tapping.

The invention is suitable in particular for communications in accordance with DSRC standard ISO 14906, EN 15509, IEEE 1609.11 or standards based thereon, wherein the derivation code is the key diversifier of this standard.

BRIEF DESCRIPTION OF THE DRAWINGS

The invention is explained in more detail below on the basis of exemplary embodiments represented in the attached drawings, wherein.

DETAILED DESCRIPTION

Figure 1:
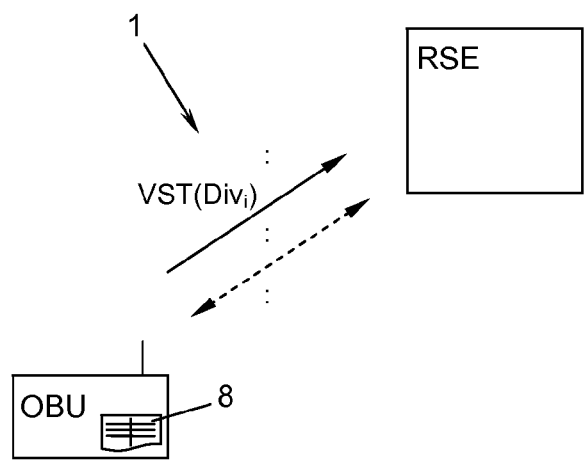
FIGS. 1 and 2 are a block diagram and a sequence diagram, respectively of a communication method between an onboard unit and a beacon in accordance with the earlier application No. 10 450 009.5.
Figure 2:
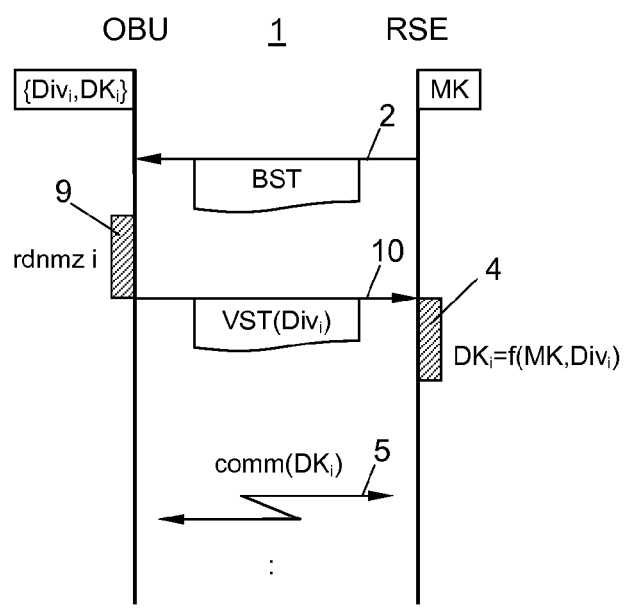

FIGS. 1 and 2 show an exemplary onboard unit OBU and an exemplary beacon RSE (roadside equipment) of a road toll system, which generally has a plurality of onboard units OBU and beacons RSE. The onboard units OBU and beacons RSE communicate with one another via a respective short-range radio interface 1 in accordance with the DSRC standard, in particular, in accordance with standard ISO 14906 or EN 15509 or standards based thereon or compatible therewith.

The beacons RSE respectively have one or more system-wide keys MK (master keys). For example, they connect to a central unit (not shown), which manages the system-wide key or keys MK for the beacons RSE or distributes this/these thereto.

For security reasons, a system-wide key MK is not stored in the onboard units OBU. Instead, the OBUs only hold keys DK (derived keys) derived individually therefrom. The individual keys DK can be used for encryption of the communication at the radio interface 1 (as encryption keys) and/or for access authorisation (as access credential keys) for access to data stored in the onboard unit OBU, as known to the person skilled in the art.

The individual keys DK are derived from the system-wide key MK, according to a given differentiation rule, wherein the derivation code (key diversifier) Div identifies the respective onboard unit-specific derivation rules used or is a parameter of these derivation rules. That is, $$DK = f(MK, Div).$$

The individual key DK can only be formed from a system-wide key MK with knowledge of the derivation code Div.

The onboard unit OBU includes a pool 8 of pairs of different derivation codes $Div_i$ and associated individual keys $DK_i$. The pool 8 can be calculated from the system-wide key MK in advance, for example, during initialisation or output of an onboard unit OBU in a programming station OPS (OBU programming station) and stored in the onboard unit OBU.

As part of a communication between the onboard unit and the beacon, the beacon RSE transmits its BST (beacon service table) request to a passing onboard unit OBU in a first step 2. After the BST request by the beacon RSE, in a step 9, the onboard unit OBU selects a pair ($Div_i$, $DK_i$) in a random manner (randomize i) (or in a pseudo-random manner) from its pool 8, and transmits the derivation code $Div_i$ of the selected pair in the VST response to the beacon RSE (step 10). Alternatively, the pair ($Div_i$, $DK_i$) can be selected from the list of pairs in the pool 8 according to specific rules, e.g., the respective oldest pair or earliest used pair first.

The beacon RSE can now derive the individual keys $DK_i$ of the respective onboard unit OBU from the system-wide key MK, on the basis of the derivation code $DK_i$ (step 4) and use it for further communication, e.g., as encryption key or access credential key (step 5).

Figure 3:
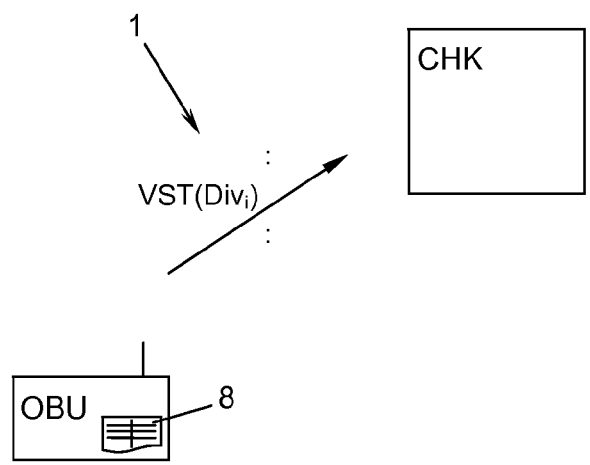
FIGS. 3 and 4 are a block diagram and a sequence diagram, respectively of a first embodiment of the authentication method of the invention.
Figure 4:
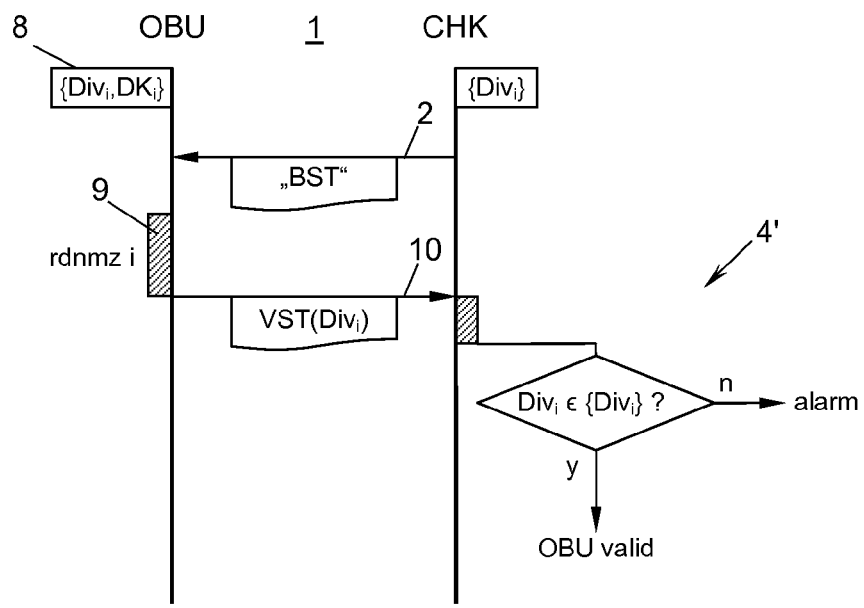

FIGS. 3 and 4 show an authentication method for checking authenticity of an onboard unit OBU. As shown, an interrogation device CHK is used, which implements or emulates at least some (or all) of the functionalities of the beacon RSE of FIGS. 1 and 2. A portion of the radio communication on the radio interface 1, which causes the onboard unit OBU to transmit one of its derivation codes $Div_i$ to the interrogation device CHK not to the beacon RSE.

The same pool 8 of pairs ($Div_i$, $DK_i$) is stored in the interrogation device CHK, as in the onboard unit OBU. In the simplest case, it would also suffice to only store the derivation codes $Div_i$ of the pool 8 in the interrogation device CHK.

After the onboard unit OBU has transmitted a random derivation code $Div_i$ from its pool 8 (steps 9, 10)—after a corresponding request by the interrogation device CHK in step 2—as described previously on the basis of FIGS. 1 and 2, in a step 4', the received derivation code $Div_i$ can now be compared with the derivation codes $Div_i$ from the pool stored in the interrogation device CHK. That is, the invention checks whether the received derivation code $Div_i$ is contained in this pool:

$$Div_i \in \{Div_i\}?$$

If this is this case (identity case "y"), the onboard unit OBU is thus validated or authenticated, i.e. checked for legitimacy. If this is not the case (non-identity case "n"), the onboard unit OBU is not authenticated (invalid) and, for example, an alarm signal can be generated and a corresponding message logged.

Figure 5:
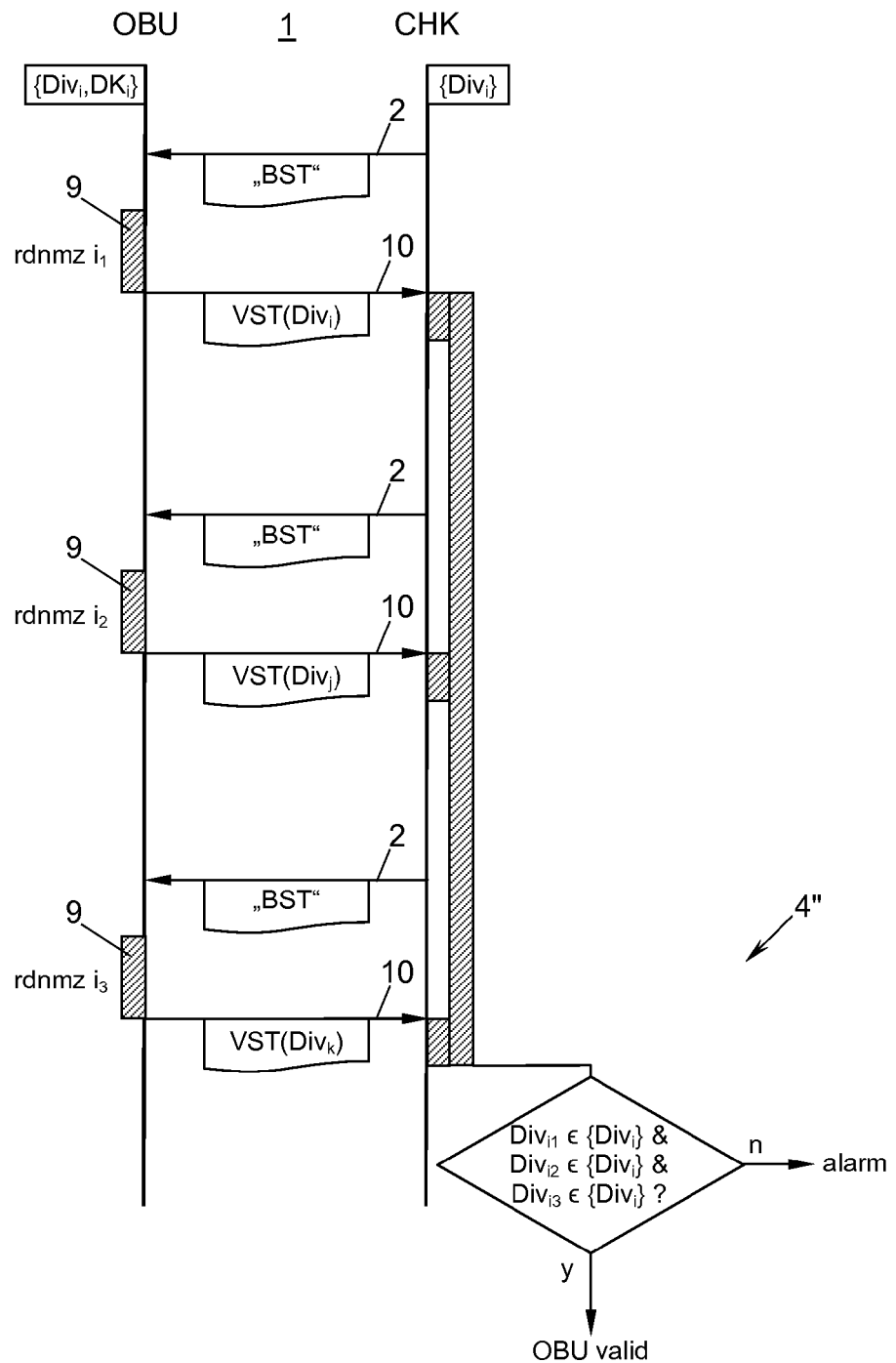
FIG. 5 is a sequence diagram of a second embodiment of the authentication method of the invention.

FIG. 5 shows a further developed embodiment of the method of FIGS. 3 and 4, in which the interrogation device CHK performs said communication steps 2, ten multiple times in succession with the onboard unit OBU. This subsequently causes the onboard unit to transmit multiple varying derivation codes $Div_{i1}$, $Div_{i2}$, $Div_{i3}$ etc. In the comparison step 4'', all the derivation codes received $Div_{i1}$, $Div_{i2}$, $Div_{i3}$ etc. are compared with the pool of derivation codes $\{Div_i\}$ stored in the interrogation device CHK. Consequently, the onboard unit OBU is only declared valid or authenticated, if all these received derivation codes are contained in the pool ("y").

An option that can be applied in each of the described methods is to use only a subset of the pool 8 in the onboard unit OBU for communications, i.e. only select special derivation code(s) $Div_{i1}$, $Div_{i2}$, $Div_{i3}$ etc. from the pool 8 for the said authentication purposes. The derivation codes of this subset are then not used for the communications of the onboard units OBU with the beacons RSE, so that they do not leave the onboard units OBU in the "normal" (beacon) operation and cannot be tapped.

The authenticity of an onboard unit can thus be checked in a simple manner without the necessity of a connection to a central unit of the toll system. In "normal" radio operation with the beacons, the pool of derivation codes stored in the onboard unit only becomes public on an individual basis over a very long period and at geographically distributed points, namely at the different beacons. The risk of attempts to deceive by tapping the air interface between the onboard unit and the beacons in order to discover this "secret" pool and thus provide fake onboard units, for example, with "genuine" derivation codes is therefore extremely low. With the method according to the present invention, the pool of derivation codes secretly contained in the onboard unit is interrogated and can thus be used to validate the authenticity of the onboard unit.

Any change of the communication protocol between the onboard units and the beacons is also unnecessary for the authentication method according to the invention, since the interrogation device emulates that part of the communication with a beacon in which the derivation codes are transmitted by the onboard unit. For this, the interrogation device can be configured in any desired manner, e.g. as a transportable or mobile device, in particular handheld device, in order to check the authenticity of an onboard unit directly on site, for example.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for auth enticating onboard units, which can conduct dedicated short-range communication (DSRC) communications with beacons of a road toll system, wherein upon a communication from an onboard unit the derivation code is transmitted to the beacon to enable the beacon to emulate the individual key for encrypting or decrypting the communication with the onboard unit or for accessing data stored in the onboard unit, the method comprising:

storing a pool of pairs of individual keys and associated derivation codes, in the onboard unit, wherein the beacons have a system-wide key and the onboard units only have individual keys, which are respectively formed from the system-wide key on the basis of a derivation code specific to each onboard unit;

in the case of consecutive communications, selecting by the onboard unit a different pair of individual key and associated derivation code from the stored pool and using said selected pair for a respective communication;

for authentication, causing the onboard unit by an interrogation device to conduct at least a portion of a radio communication, in which the onboard unit transmits to the interrogation device the selected associated derivation code;

receiving the selected associated derivation code in the interrogation device and comparing it with the derivation codes of the pool; and authenticating the onboard unit when identity is established according to said comparing.

2. The method according to claim 1, wherein the onboard unit is caused by the interrogation device to conduct consecutive communications to receive multiple different derivation codes and the received multiple different derivation codes are compared with the derivation codes of the pool, and wherein the onboard unit is only authenticated when all comparisons establish identity.

3. A method for authenticating onboard units, which can conduct dedicated short-range communication (DSRC) communications with beacons of a road toll system, wherein the beacons have a system-wide key and the onboard units only have individual keys, which are respectively formed from the system-wide key on the basis of a derivation n code specific to each onboard unit, wherein upon a communication from an onboard unit the derivation code is transmitted to the beacon to enable the beacon to emulate the individual key for encrypting or decrypting the communication with the onboard unit or for accessing data stored in the onboard unit, the method comprising:

storing a pool of pairs of individual keys and associated derivation codes, in the onboard unit;

in the case of consecutive communications, selecting by the onboard un it another pair of individual key and associated derivation code from the stored pool and using said selected pair for a respective communication;

for authentication, causing the onboard unit by an interrogation device to conduct at least a portion of a radio communication, in which the onboard unit transmits the selected associated derivation code;

receiving the selected associated derivation code in the interrogation device and comparing it with the derivation codes of the pool; and authenticating the onboard unit when identity is established according to said comparing, wherein the pair is selected randomly or pseudo-randomly from the stored pool.

4. The method according to claim 3, wherein the onboard unit is caused by the interrogation device to conduct consecutive communications to receive multiple different derivation codes and the received multiple different derivation codes are compared with the derivation codes of the pool, and wherein the onboard unit is only authenticated when all comparisons establish identity.

5. The method according to claim 3, wherein the pair is selected in the onboard unit from a subset of the stored pool, and wherein the subset of the stored pool is only used in the case of communications with interrogating devices and not in communications with beacons.

6. The method according to claim 3, wherein the communication occurs in accordance with DSRC standard ISO 14906, EN 15509, IEEE 1609.11 or a stand and based thereon and the derivation code is the key diversifier of said standard.

7. The method according to claim 1, wherein the pair is selected in the onboard unit from a subset of the stored pool, and wherein the subset of the stored pool is only used in the case of communications with interrogating devices and not in communications with beacons.

8. The method according to claim 1, wherein the communication occurs in accordance with DSRC standard ISO 4906, EN 15509, IEEE 1609.11 or a standard based there on and the derivation code is the key diversifier of said standard.

* * * * *